(12) United States Patent
Little

(10) Patent No.: US 12,078,103 B1
(45) Date of Patent: Sep. 3, 2024

(54) ANTI-ICE MIXING UNIT UTILIZING BLEED AIR FOR A GAS TURBINE ENGINE

(71) Applicant: Rolls-Royce North American Technologies Inc., Indianapolis, IN (US)

(72) Inventor: Rex M. Little, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/230,442

(22) Filed: Aug. 4, 2023

(51) Int. Cl.
*F02C 7/047* (2006.01)
*F02C 6/08* (2006.01)
*F02C 9/18* (2006.01)

(52) U.S. Cl.
CPC .............. *F02C 7/047* (2013.01); *F02C 6/08* (2013.01); *F02C 9/18* (2013.01)

(58) Field of Classification Search
CPC ... F02C 7/047; B64D 2033/0233; F15B 15/12
USPC .......................................................... 91/177
See application file for complete search history.

(56) References Cited

U.S. PATENT DOCUMENTS

| | | | |
|---|---|---|---|
| 3,981,466 A * | 9/1976 | Shah ...................... | F02C 7/047 60/39.093 |
| 5,423,174 A | 6/1995 | Mouton | |
| 9,022,319 B2 | 5/2015 | Ji | |
| 9,359,959 B2 | 6/2016 | Cuevas et al. | |
| 9,945,247 B2 | 4/2018 | Appukuttan et al. | |
| 10,260,371 B2 | 4/2019 | Youssef et al. | |
| 10,421,551 B2 * | 9/2019 | Greenberg ............. | B64D 15/02 |
| 10,731,502 B2 * | 8/2020 | Ackermann .............. | F02C 9/18 |
| 10,737,792 B2 | 8/2020 | Mackin | |
| 11,078,841 B2 | 8/2021 | Mackin et al. | |
| 11,130,583 B2 | 9/2021 | Radhakrishnan et al. | |
| 2010/0028126 A1 * | 2/2010 | Sheldon ................ | F01D 21/006 415/30 |
| 2010/0092116 A1 * | 4/2010 | Franconi ............... | F01D 25/183 384/317 |
| 2012/0045317 A1 * | 2/2012 | Saladino ................... | F02C 6/08 415/145 |
| 2013/0192250 A1 * | 8/2013 | Glahn ....................... | F02C 6/08 60/785 |
| 2015/0104289 A1 * | 4/2015 | Mackin ............... | F04D 27/0215 415/1 |
| 2015/0252731 A1 * | 9/2015 | Riordan .................... | F02C 3/13 60/785 |

(Continued)

*Primary Examiner* — Todd E Manahan
*Assistant Examiner* — Marc J Amar
(74) *Attorney, Agent, or Firm* — Barnes & Thornburg LLP

(57) ABSTRACT

A thermal management system for a gas turbine engine includes an inlet, a compressor, a mixing unit, and a fuel source. The compressor includes a low pressure stage and a high pressure stage. The mixing unit includes a first valve port fluidically connected to a low pressure bleed line of the compressor and a high pressure bleed line of the compressor and having an adjustable inlet gate on each of these lines and an outlet fluidically connected to the inlet of the engine to prevent ice accretion in the inlet or de-ice the inlet. The fuel source is configured to provide fuel to the mixing unit to actuate the adjustable inlet gates to regulate the amounts of low pressure bleed air and high pressure bleed air directed to the outlet.

18 Claims, 3 Drawing Sheets

(56) References Cited

U.S. PATENT DOCUMENTS

| | | | |
|---|---|---|---|
| 2016/0123237 A1* | 5/2016 | Spagnoletti | F16K 27/04 |
| | | | 60/776 |
| 2017/0114808 A1* | 4/2017 | Cowie | E21B 34/02 |
| 2017/0233081 A1* | 8/2017 | Sautron | F02C 6/08 |
| | | | 60/783 |
| 2018/0209341 A1* | 7/2018 | Nakahara | F02C 7/057 |
| 2018/0298817 A1* | 10/2018 | Kalya | F01D 25/02 |
| 2020/0032702 A1* | 1/2020 | Kupratis | F02C 6/02 |

* cited by examiner

ANTI-ICE MIXING UNIT UTILIZING BLEED AIR FOR A GAS TURBINE ENGINE

FIELD OF THE DISCLOSURE

The present disclosure relates generally to gas turbine engines, and more specifically to anti-icing systems of gas turbine engines.

BACKGROUND

During operation in icing conditions, gas turbine engine components may accrete significant amounts of ice. Accreted ice is of particular concern to engine components such as the spinner, inlet cowling, inlet guide vanes, and splitter assembly. Ice accretion on these components may compromise engine performance. Shedding of accreted ice may result in mechanical damage to downstream gas turbine components or cause instabilities in the compression and combustion systems. Therefore, gas turbine engines employ systems to either proactively shed small amounts of accreted ice or apply heating to affected surfaces to avoid ice accretion.

SUMMARY

The present disclosure may comprise one or more of the following features and combinations thereof.

According to an aspect of the present disclosure, a thermal management system for a gas turbine engine an inlet, an engine core, a mixing unit, and a fuel source. The engine core includes a compressor having a low pressure stage and a high pressure stage axially downstream of the low pressure stage. The low pressure stage provides low pressure air and has a low pressure bleed line configured to receive a portion of the low pressure air as low pressure bleed air. The high pressure stage provides high pressure air having a pressure greater than the low pressure air. The high pressure stage has a high pressure bleed line configured to receive a portion of the high pressure air as high pressure bleed air. The mixing unit includes a first valve port fluidically connected to the low pressure bleed line and the high pressure bleed line and an outlet. The first valve port has an adjustable inlet gate on each of these lines. The outlet fluidically connected to the inlet of the engine to prevent ice accretion in the inlet or de-ice the inlet. The adjustable inlet gate regulates the amounts of the low pressure bleed air from the low pressure bleed line and high pressure bleed air from the high pressure bleed line flowing to the outlet. The fuel source includes a fuel flow control valve configured to provide a first portion of fuel at a first fuel pressure to the mixing unit. The fuel flow control valve selectively directs the first portion of the fuel to the mixing unit such that the first portion of the fuel engages with and selectively actuates the adjustable inlet gate so as to regulate the amounts of low pressure bleed air and high pressure bleed air flowing to the outlet and exiting the outlet as valve outlet fluid such that the first temperature of the valve outlet fluid is equal to or greater than a predetermined temperature such that the valve outlet fluid prevents ice accretion in the inlet or de-ices the inlet.

In some embodiments, the thermal management system further includes a control system including a controller configured to receive the first temperature of the valve outlet fluid flowing from the outlet of the first valve port to the inlet of the engine. The controller is configured to selectively direct the first portion of fuel from the fuel source to the mixing unit so as to selectively actuate the adjustable inlet gate so as to regulate the amounts of low pressure bleed air and high pressure bleed air flowing to the outlet and exiting the outlet as valve outlet fluid based on a second temperature of the low pressure bleed air and a third temperature of the high pressure bleed air. The second and third temperatures are configured to be measured via additional sensors and/or calculated by the controller.

In some embodiments, the thermal management system further includes an output line fluidically connected to and extending between the outlet of the first valve port and the inlet of the engine. The control system further includes a first temperature sensor communicatively connected to the controller and arranged along the output line so as to measure the temperature of the valve outlet fluid flowing therein and communicate the first temperature to the controller.

In some embodiments, the controller is further configured to dynamically set the predetermined temperature of the valve outlet fluid that prevents ice accretion in the inlet of engine based on at least one operating condition of the gas turbine engine that includes a low power state and a high power state. In some embodiments, the low power state includes at least one of idle or taxiing, and wherein the high power state includes at least one of takeoff, cruise, or landing.

In some embodiments, the control system further includes a first pressure sensor and a second temperature sensor arranged in the high pressure stage of the compressor and a second pressure sensor and a third temperature sensor arranged in the inlet. The controller may be configured to dynamically set the predetermined temperature of the valve outlet fluid that prevents ice accretion in the inlet of engine based on at least one operating parameter including at least one of a high pressure stage pressure measured by the first pressure sensor, a high pressure stage temperature measured by the second temperature sensor, an inlet pressure measured by the second pressure sensor, a speed of the compressor, a flow rate of fuel to a combustor included in the engine core, or an inlet temperature measured by the third temperature sensor.

In some embodiments, the controller is configured to automatically and selectively control the fuel flow control valve based on the at least one operating condition and the at least one operating parameter so as to automatically and selectively direct the first portion of fuel from the fuel source to the mixing unit and regulate the amounts of low and high pressure bleed air from the low and high pressure bleed lines so as to regulate the temperature of the valve outlet fluid. The controller is further configured to automatically increase the temperature of the valve outlet fluid via control of the fuel flow control valve in response to the first temperature being lower than the predetermined temperature such that the first temperature is equal to or greater than the predetermined temperature.

In some embodiments, the controller is configured to electronically control the fuel flow control valve to selectively direct the first portion of fuel from the fuel source to the mixing unit. The controller is configured to electronically control the fuel flow control valve by sending a signal to the fuel flow control valve.

In some embodiments, the first valve port includes a mixing chamber within the adjustable inlet gate, a first inlet fluidically connected to the low pressure bleed line and discharging into the mixing chamber, and a second inlet fluidically connected to the high pressure bleed line and discharging into the mixing chamber. The low and high pressure bleed air from the low and high pressure bleed lines is configured to enter the mixing chamber and subsequently exit the first valve port via the outlet. The adjustable inlet gate is configured to selectively open and close the first and second inlets so as to regulate the amounts of low and high pressure bleed air from the low and high pressure bleed lines flowing into the mixing chamber and subsequently to the outlet. The valve outlet fluid includes a mixture of the low pressure bleed air and the high pressure bleed air.

In some embodiments, the mixing unit further includes a first actuator fixedly coupled to the adjustable inlet gate. The adjustable inlet gate includes a first opening and a second opening spaced apart from the first opening and is configured to move between (i) a first arrangement in which the adjustable inlet gate substantially covers the first inlet and the second opening aligns with the second inlet, and (ii) a second arrangement in which the adjustable inlet gate substantially covers the second inlet and the first opening aligns with the first inlet, and wherein the first portion of fuel is configured to engage with the first actuator so as to move the adjustable inlet gate between and including the first and second arrangements.

In some embodiments, the first actuator is a rotating actuator and the adjustable inlet gate is rotatable and is configured to be rotated via rotation of the first actuator. The first portion of fuel is configured to engage with the first actuator so as to rotate the first actuator in a first rotational direction or a second rotational direction opposite the first rotational direction so as to rotate the adjustable inlet gate between and including the first and second arrangements.

According to another aspect of the disclosure, a thermal management system for a gas turbine engine includes an inlet, an engine core, an environmental control system assembly, and a control system. The engine core includes a compressor having a low pressure stage and a high pressure stage axially downstream of the low pressure stage. The low pressure stage provides low pressure air and has a low pressure bleed line configured to receive a portion of the low pressure air as low pressure bleed air. The high pressure stage provides high pressure air having a pressure greater than the low pressure air. The high pressure stage has a high pressure bleed line configured to receive a portion of the high pressure air as high pressure bleed air.

The environmental control system assembly includes a fuel source and a mixing unit. The mixing unit includes a first valve port fluidically connected to the low pressure bleed line and the high pressure bleed line and an outlet fluidically connected to the inlet of the engine to prevent ice accretion in the inlet or de-ice the inlet. The first valve port receives low pressure bleed air and high pressure bleed air from the low pressure bleed line and the high pressure bleed line. A first portion of fuel at a first fuel pressure from the fuel source is configured to selectively actuate the first valve port so as to selectively regulate amounts of low pressure bleed air from the low pressure bleed line and the high pressure bleed air from the high pressure bleed line flowing to the outlet and exiting the outlet as valve outlet fluid.

The control system includes a controller configured to receive a first temperature of the valve outlet fluid flowing from the outlet of the first valve port to the inlet of the engine. The controller is configured to selectively direct the first portion of fuel from the fuel source to the mixing unit so as to selectively actuate the first valve port and thus regulate the amounts of low and high pressure bleed air flowing to and exiting the outlet as the valve outlet fluid such that the first temperature of the valve outlet fluid is equal to or greater than a predetermined temperature such that the valve outlet fluid prevents ice accretion in the inlet of engine.

In some embodiments, the thermal management system includes an output line fluidically connected to and extending between the outlet of the first valve port and the inlet of the engine. The control system includes a first temperature sensor communicatively connected to the controller and arranged along the output line so as to measure the temperature of the valve outlet fluid flowing therein and communicate the first temperature to the controller. The controller is configured to selectively direct a first portion of fuel from the fuel source to the mixing unit so as to selectively actuate the first valve port and thus regulate the amounts of low and high pressure bleed air flowing to and exiting the outlet as the valve outlet fluid based on a second temperature of the low pressure bleed air and a third temperature of the high pressure bleed air. The second and third temperatures are configured to be measured via additional sensors and/or calculated by the controller.

In some embodiments, the controller is further configured to dynamically set the predetermined temperature of the valve outlet fluid that prevents ice accretion in the inlet of engine based on at least one operating condition of the gas turbine engine that includes a low power state and a high power state. In some embodiments, the low power state includes at least one of idle or taxiing, and wherein the high power state includes at least one of takeoff, cruise, or landing.

In some embodiments, the control system further includes a first pressure sensor and a second temperature sensor arranged in a high pressure stage of the compressor to which the high pressure bleed line is fluidically connected. The control system further includes a second pressure sensor and a third temperature sensor arranged in the inlet. The controller dynamically sets the predetermined temperature of the valve outlet fluid that prevents ice accretion in the inlet of engine further based on at least one operating parameter including at least one of a high pressure stage pressure measured by the first pressure sensor, a high pressure stage temperature measured by the second temperature sensor, an inlet pressure measured by the second pressure sensor, or an inlet temperature measured by the third temperature sensor.

In some embodiments, the controller is configured to automatically and selectively control the fuel flow control valve based on the at least one operating condition and the at least one operating parameter so as to automatically and selectively direct the first portion of fuel from the fuel source to the mixing unit and regulate the amounts of low and high pressure bleed air from the low and high pressure bleed lines so as to regulate the temperature of the valve outlet fluid. The controller is further configured to automatically increase the temperature of the valve outlet fluid via control of the fuel flow control valve in response to the first temperature being lower than the predetermined temperature such that the first temperature is equal to or greater than the predetermined temperature.

In some embodiments, the controller is configured to electronically control the fuel flow control valve to selectively direct the first portion of fuel from the fuel source to the mixing unit. The controller is configured to electronically control the flow control valve by sending a signal to the fuel flow control valve.

In some embodiments, the first valve port includes a mixing chamber within the adjustable inlet gate, a first inlet fluidically connected to the low pressure bleed line and discharging into the mixing chamber, a second inlet fluidically connected to the high pressure bleed line and discharging into the mixing chamber, and an adjustable inlet gate actuatable by the first portion of fuel from the fuel source and configured to selectively open and close the first and second inlets. The outlet is fluidically connected to the inlet of the engine, and wherein the valve outlet fluid includes a mixture of the low pressure bleed air and the high pressure bleed air.

According to another aspect, a method includes a number of steps. The method includes providing an inlet and an engine core including a compressor, the compressor having a low pressure stage and a high pressure stage axially downstream of the low pressure stage, the low pressure stage configured to provide low pressure air and having a low pressure bleed line configured to receive a portion of the low pressure air as low pressure bleed air, and the high pressure stage configured to provide high pressure air having a pressure greater than the low pressure air, and the high pressure stage having a high pressure bleed line configured to receive a portion of the high pressure air as high pressure bleed air, providing an environmental control system assembly including a fuel source and a mixing unit, the mixing unit including a first valve port fluidically connected to the low pressure bleed line and the high pressure bleed line and configured to receive low pressure bleed air and high pressure bleed air from the low pressure bleed line and the high pressure bleed line, and an outlet fluidically connected to the inlet of the engine to prevent ice accretion in the inlet or de-ice the inlet, wherein a first portion of fuel at a first fuel pressure from the fuel source is configured to selectively actuate the first valve port so as to selectively regulate amounts of low pressure bleed air from the low pressure bleed line and the high pressure bleed air from the high pressure bleed line flowing to the outlet and exiting the outlet as valve outlet fluid, supplying low pressure bleed air and high pressure bleed air to the mixing unit via the low pressure bleed line and the high pressure bleed line so as to form the valve outlet fluid, receiving, at a controller of a control system, a first temperature of the valve outlet fluid flowing from the outlet to the inlet of the engine, and selectively directing, via the controller, the first portion of fuel from the fuel source to the mixing unit so as to selectively actuate the first valve port and thus regulate the amounts of low pressure bleed air and high pressure bleed air flowing to and exiting the outlet as the valve outlet fluid such that the first temperature of the valve outlet fluid is equal to or greater than a predetermined temperature such that the valve outlet fluid prevents ice accretion in the inlet or de-ices the inlet.

These and other features of the present disclosure will become more apparent from the following description of the illustrative embodiments.

DETAILED DESCRIPTION

Figure 1:
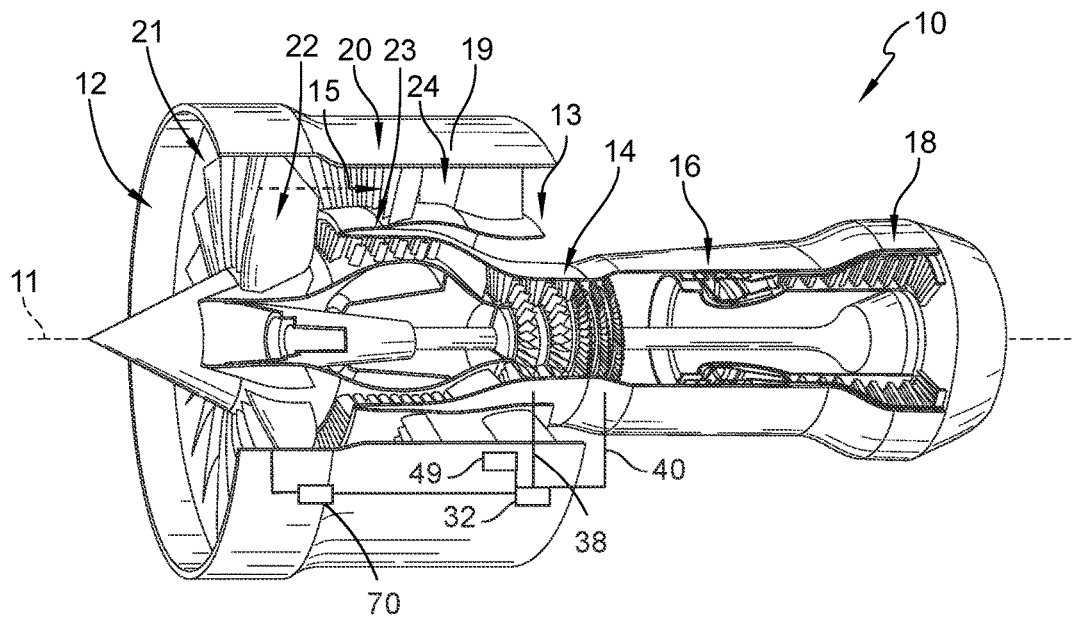
FIG. 1 is a cutaway view of a gas turbine engine that includes an inlet, a fan, a bypass duct, a compressor, a combustor downstream of the compressor, and a turbine downstream of the combustor.

For the purposes of promoting an understanding of the principles of the disclosure, reference will now be made to a number of illustrative embodiments shown in the drawings and specific language will be used to describe the same.

An illustrative aerospace gas turbine engine 10 includes an inlet 12 and an engine core 13, the engine core 13 having a compressor 14, a combustor 16 located downstream of the compressor 14, and a turbine 18 located downstream of the combustor 16 as shown in FIG. 1. A fan 21 arranged in the inlet is driven by the turbine 18 and provides thrust for propelling the gas turbine engine 10 by forcing air 15 through a bypass duct 20. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 21.

The fan 21 includes a plurality of fan blades 22 that extend radially outward relative to the central axis 11 as shown in FIG. 1. The plurality of fan blades 22 rotate about the central axis 11 to force the air 15 through a flow path 24 such that the air 15 is directed through the bypass duct 20 to provide thrust to propel the gas turbine engine 10.

Figure 2:
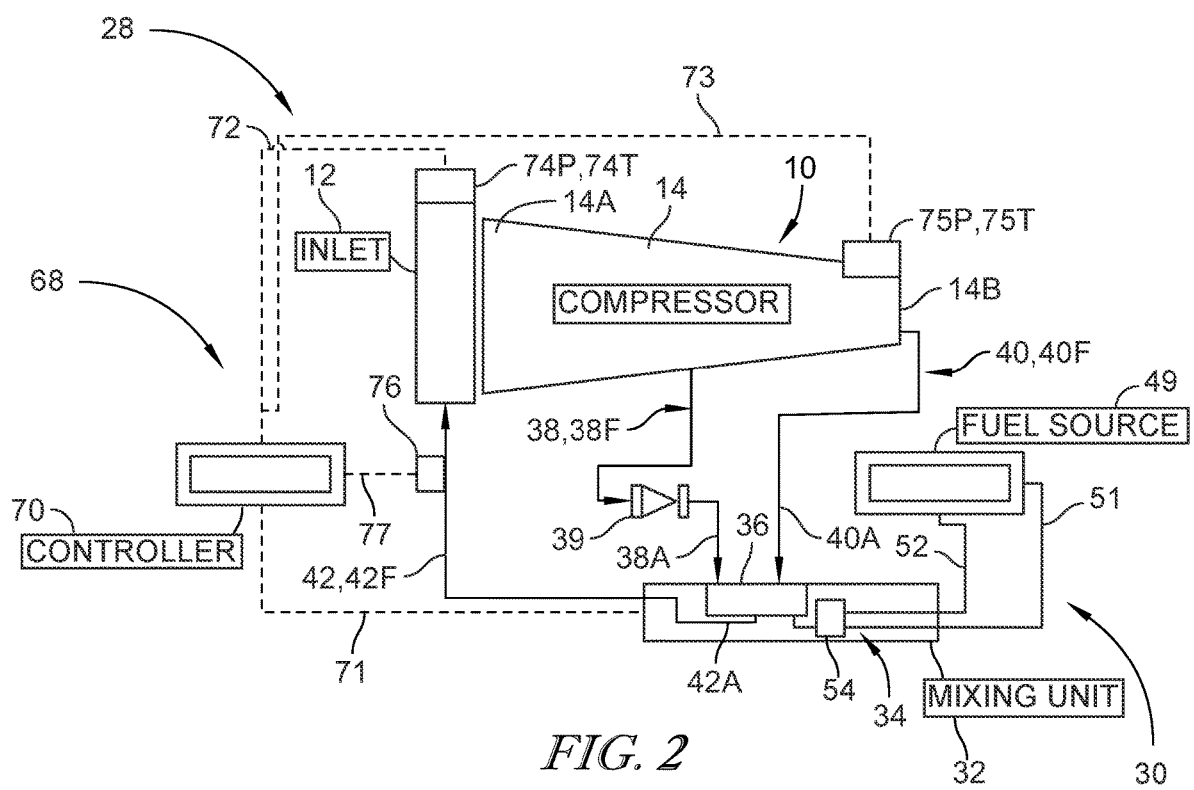
FIG. 2 is a schematic view of a thermal management system configured to be utilized with the gas turbine engine of FIG. 1, showing that the system includes bleed lines connected to the low and high pressure compressor stages and to a mixing unit, a fuel source, and a controller configured to regulate amounts of low and high pressure compressor bleed air to the mixing unit and deliver a mixed output to the inlet of the engine.

The bypass duct 20 is arranged circumferentially around the central axis 11 and includes an outer wall 19 and an inner wall 23 as shown in FIG. 2. The outer wall 19 defines a radially outer boundary of the flow path 24 of the bypass duct 20. The inner wall 23 defines a radially inner boundary of the flow path 24 of the bypass duct 20. The bypass duct 20 is configured to direct the air 15 through the flow path 24 to provide thrust to propel the gas turbine engine 10.

The gas turbine engine 10 of FIG. 1 may include a thermal management system 28 configured to prevent ice accretion on the engine components in the inlet 12 or de-ice the engine components in the inlet 12, as shown in FIG. 2. The thermal management system 28 may include an environmental control system assembly 30 and a controller 70, also referred to as an electronic engine controller (EEC), configured to control the de-icing features of the thermal management system 28. In particular, the controller 70 is configured to control an amount of low pressure bleed air 38F supplied to a first valve port 36 of a mixing unit 32 of the environmental control system assembly 30 from a low pressure stage 14A and an amount of high pressure bleed air 40F supplied to the first valve port 36 from a high pressure stage 14B of the compressor 14. The low pressure bleed air 38F and high pressure bleed air 40F are mixed in the first valve port 36 and output to the inlet 12 of the engine 10 to prevent ice accretion in the inlet 12 or de-ice the inlet 12.

As can be seen in FIG. 2, the compressor 14 includes a low pressure stage 14A located toward an axially forward end of the compressor 14, and a high pressure stage 14B axially aft of the low pressure stage 14A. The low pressure stage 14A is configured to operate at a lower pressure than the high pressure stage 14B. The thermal management system 28 includes a low pressure bleed line 38 fluidically connected to the low pressure stage 14A and extending between and interconnecting the low pressure stage 14A and the first valve port 36 of the mixing unit 32. Low pressure bleed air 38F is configured to flow through the low pressure bleed line 38 from the low pressure stage 14A to the first valve port 36. In some embodiments, the low pressure bleed line 38 includes a non-return valve 39 arranged along the line 38 such that the high pressure bleed air 40F does not flow into the low pressure stage 14A.

Similarly, the thermal management system 28 includes a high pressure bleed line 40 fluidically connected to the high pressure stage 14B and extending between and interconnecting the high pressure stage 14B and the first valve port 36. High pressure bleed air 40F is configured to flow through the high pressure bleed line 40 from the high pressure stage 14B to the first valve port 36.

As will be described in greater detail below, the low and high pressure bleed air 38F, 40F directed to the first valve port 36 from the low and high pressure bleed lines 38, 40 provide two sources of compressor 14 bleed air that may be utilized by the thermal management system 28 to prevent ice accretion in the inlet 12 or de-ice the inlet 12. In some embodiments, the low pressure bleed air 38F and the high pressure bleed air 40F are mixed in the first valve port 36 to form a valve outlet fluid 42F that subsequently exits the first valve port 36 and flows to the inlet 12. In some embodiments, only one of the low pressure bleed air 38F and the high pressure bleed air 40F exit the first valve port 36 as the valve outlet fluid. The amount of low and high pressure bleed air 38F, 40F in the valve outlet fluid 42F can be selectively adjusted by the first valve port 36 based on predetermined requirements and/or dynamically determined requirements to inlet 12 of the engine 10.

As can be seen in FIG. 2, the mixing unit 32 of the environmental control system assembly 30 of the thermal management system 28 may include a housing 34, within which the first valve port 36 is arranged. The mixing unit 32 may further include a first actuator 54 arranged within the housing 34 and configured to actuate the first valve port 36 so as to regulate the amount of low and high pressure bleed air 38F, 40F in the valve outlet fluid 42F.

Figure 3:
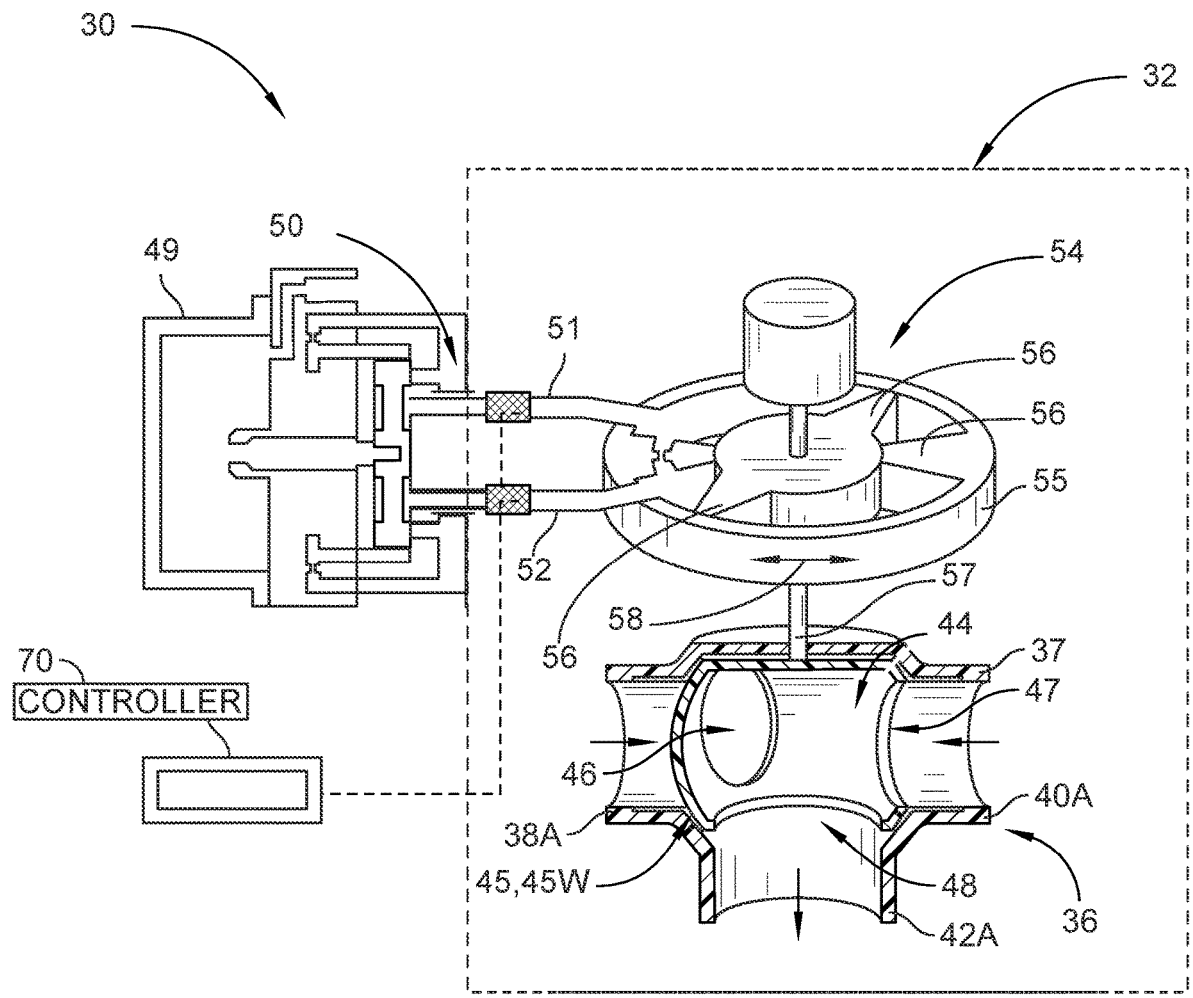
FIG. 3 is a simplified cross-sectional view of a first valve port of the mixing unit and the fuel source of FIG. 2, showing that the controller is electrically and operably connected to an output of the fuel source and configured to apply differential fuel pressure from the fuel source to the first valve port so as to selectively actuate the first valve port and thus regulate the amounts of low and high pressure bleed air flowing to the outlet to form the mixed output.

Illustratively, the first valve port 36 includes a main housing 37 and is configured as a three-way valve with two inlets 38A, 40A and an outlet 42A, as shown in FIG. 3. Specifically, the first valve port 36 includes a first inlet 38A fluidically connected to the low pressure bleed line 38 and discharging into a central mixing chamber 44 of an adjustable inlet gate 45 arranged in the main housing 37. The first valve port 36 further includes a second inlet 40A spaced apart from the first inlet 38A. The second inlet 40A is fluidically connected to the high pressure bleed line 40 and discharges into the mixing chamber 44. The first valve port 36 also includes the outlet 42A which receives fluid from the mixing chamber 44 and discharges it to the output line 42 as valve outlet fluid 42F.

As shown in FIG. 3, the first valve port 36 further includes an adjustable inlet gate 45 arranged within the main housing 37. The adjustable inlet gate 45 is configured to selectively open and close the first and second inlets 38A, 40A in order to regulate amounts of low pressure bleed air 38F and high pressure bleed air 40F from the low and high pressure bleed lines 38, 40 flowing into the mixing chamber 44 via the inlets 38A, 40A. In some embodiments, the adjustable inlet gate 45 is configured to fully open, fully close, or partially open the first and second inlets 38A, 40A so as to adjust an amount of each of the low pressure bleed air 38F and high pressure bleed air 40F in the final valve outlet fluid 42F.

Illustratively, the adjustable inlet gate 45 is formed as a rotatable hollow member having an outer wall 45W defining the mixing chamber 44 therein. The adjustable inlet gate 45 includes a first opening 46 located on a side of an outer wall 45W of the adjustable inlet gate 45 generally facing toward the first inlet 38A, a second opening 47 located on a side the outer wall 45W of the adjustable inlet gate 45 generally facing toward the second inlet 40A, as shown in FIG. 3. The adjustable inlet gate 45 may further include a third opening 48 on an underside of the adjustable inlet gate 45 and facing toward the outlet 42A.

In operation, the adjustable inlet gate 45 can be rotated about an axis (aligned with the rotation rod 57 described below) such the first and second openings 46, 47 can be selectively aligned with the first and second inlets 38A, 40A. In some embodiments, the first and second openings 46, 47 are spaced apart about the circumferential surface of the adjustable inlet gate 45 such that rotation of the adjustable inlet gate 45 in a first rotational direction or a second rotational direction opposite the first rotational direction will simultaneously affect the opening and closing of the first and second inlets 38A, 40A. The third opening 48 is always aligned with the outlet 42A during rotation of the adjustable inlet gate 45 such that fluid may continuously flow from the mixing chamber 44 to the outlet 42A.

Figure 4A:
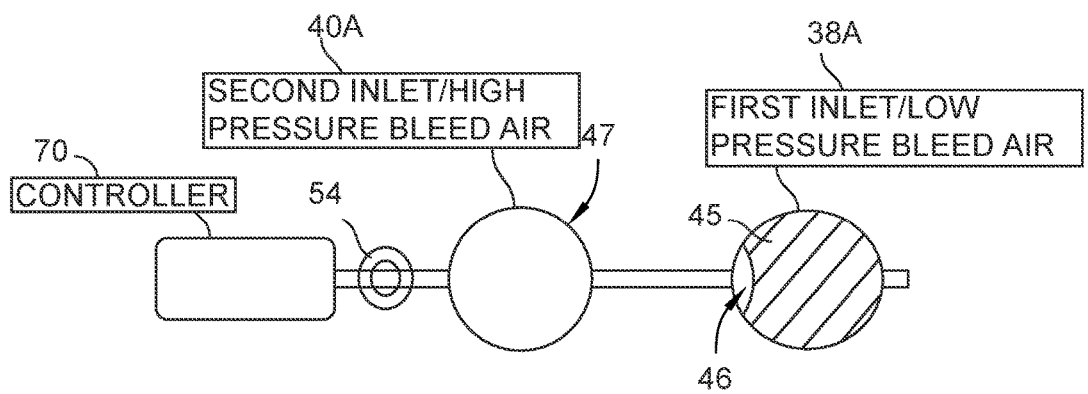
FIG. 4A is a schematic view of the controller and inlets of the first valve port of FIG. 3, showing that the low pressure inlet on the right is mostly closed and the high pressure inlet on the left is entirely open, this arrangement corresponding to a low power scenario of the engine.
Figure 4B:
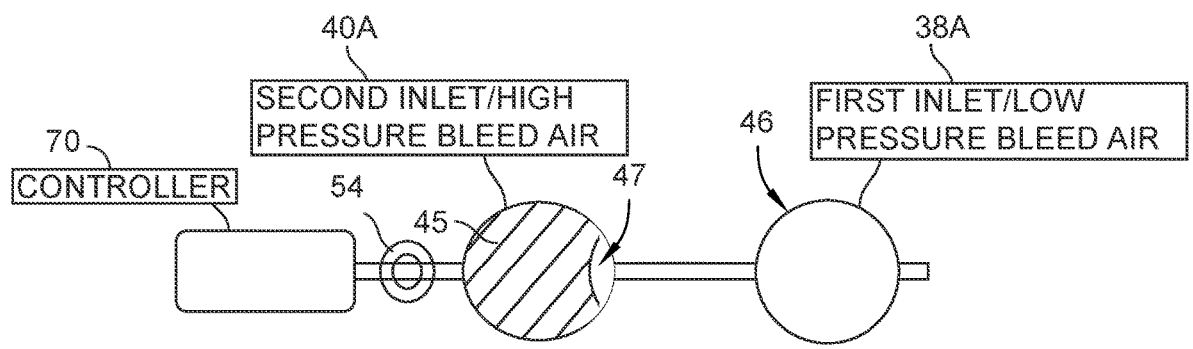
FIG. 4B is a schematic view of the controller and the inlets of the first valve port of FIG. 3, showing that the low pressure inlet on the right is entirely open and the high pressure inlet on the left is mostly closed, this arrangement corresponding to a high power scenario of the engine.

Non-limiting examples of positions of the adjustable inlet gate 45 are shown schematically in FIGS. 4A and 4B. As can be seen in FIG. 4A, in a first arrangement, the outer wall 45W of the adjustable inlet gate 45 substantially covers the first inlet 38A while the second opening 47 aligns with the second inlet 40A, thus allowing the high pressure bleed air 40F to flow into the mixing chamber 44. The high pressure bleed air 40F will tend to induce a reverse flow of the low pressure bleed air 38F, but the non-return valve 39 will prevent the high pressure bleed air 40F from entering the low pressure stage 14A. As can be seen in FIG. 4B, in a second arrangement, the outer wall 45W of the adjustable inlet gate 45 substantially covers the second inlet 40A while the second opening 46 aligns with the first inlet 38A, thus allowing the low pressure bleed air 38F to flow into the mixing chamber 44 while preventing most of the high pressure bleed air 40F from flowing into the mixing chamber 44.

The term "substantially" as used herein may be construed to mean that more than 90% of the inlet 38A, 40A, is closed, as can be seen by the small portion of the respective openings 46, 47 visible in the substantially closed inlets 38A, 40A of FIGS. 4A and 4B. In such an embodiment, because the inlets 38A, 40A are always at least partially open, even by a miniscule amount, the valve outlet fluid 42F includes a mixture of the low pressure bleed air 38F and the high pressure bleed air 40F.

A person skilled in the art will understand that the spacing between the openings 46, 47 in the circumferential direction 58 of the adjustable inlet gate 45 affects the extent to which one inlet 38A, 40A is open when the other inlet 38A, 40A is closed. For example, if the openings 46, 47 are formed closer to each other in the circumferential direction 58 relative to the description above, then the one inlet 38A, 40A would be fully open when the other inlet 38A, 40A is fully closed. Conversely, if the openings 46, 47 are formed further apart from to each other in the circumferential direction 58 relative to the description above, then the one inlet 38A, 40A would not be as "closed" (for example, 80% of the inlet 38A, 40A being closed) when the other inlet 38A, 40A is fully closed.

Moreover, a person skilled in the art will understand that, although a rotatable three-way valve is illustrated as the adjustable inlet gate 45, other types of three-way valves capable of regulating amounts of two fluids entering the valve so as to regulate the valve outlet fluid 42F flowing therefrom may be utilized based on the design requirements of the engine 10.

As shown in FIG. 3, the environmental control system assembly 30 may further include a fuel source 49. The fuel source 49 may be any source of fuel from the engine 10 or the aircraft (not shown) being propelled by the engine 10 that is capable of supplying fuel to the mixing unit 32. The fuel source 49 may include a fuel flow control valve 50 configured to provide a first portion of fuel at a first fuel pressure to the mixing unit 32. As shown in FIG. 3, the first portion of fuel may be delivered to the first actuator 54 of the mixing unit 32 via a first fuel line 51 or a second fuel line 52.

The first actuator 54 is operably connected to the first and second fuel lines 51, 52, as shown in FIG. 3. The first actuator 54 includes an annular support ring 55 surrounding a rotation rod 57, and a plurality of spokes 56 extending from the support ring 55 to the rotation rod 57. The rotation rod 57 is fixedly coupled to the adjustable inlet gate 45.

As shown schematically in FIG. 3, the first portion of fuel having a first fuel pressure from the fuel source 49 can be selectively directed toward one of the spokes 56 so as to rotate the first actuator 54. For example, if the first portion of fuel from the fuel source 49 is directed toward one of the spokes 56 on the far side of annular support ring 55, the first actuator 54 would rotate in the clockwise direction, as viewed in FIG. 3. Conversely, if the first portion of fuel from the fuel source 49 is directed toward one of the spokes 56 on the near side of annular support ring 55, the first actuator 54 would rotate in the counterclockwise direction, as viewed in FIG. 3. A person skilled in the art will understand that, although a rotatable actuator 54 is illustrated, other types of actuators that are actuatable by the fuel source 49 may be utilized based on the design requirements of the engine 10.

Because the rotation rod 57 is fixedly coupled to the adjustable inlet gate 45, rotation of the first actuator 54 causes rotation of the adjustable inlet gate 45. As a result, the amounts of low pressure bleed air 38F and high pressure bleed air 40F flowing to the outlet 42A and exiting the outlet 42A as valve outlet fluid 42F can be selectively regulated via the fuel flow control valve 50 selectively directing fuel to the first actuator 54 via the first and second fuel lines 51, 52 to rotate the adjustable inlet gate 45.

During operation of the engine 10, the temperatures of the low pressure bleed air 38F and the high pressure bleed air 40F will vary based on the operating conditions of the engine 10. Because of this variance, the amounts of the low pressure bleed air 38F and the high pressure bleed air 40F can be adjusted based on the operating conditions of the engine 10 in order to discharge valve outlet fluid 42A at a temperature sufficient to prevent ice accretion in the inlet 12 or de-ice the inlet 12.

In order to adjust the amounts of the low pressure bleed air 38F and the high pressure bleed air 40F exiting the first valve port 36 as the valve outlet fluid 42A, a control system 68 is provided as shown in FIG. 2. Illustratively, the control system 68 includes a controller 70 operably and communicatively connected to the mixing unit 32, in particular to the fuel flow control valve 50 of the fuel source 49 via a first communication line 71.

As shown in FIG. 2, the control system 68 can further include sensors 74P, 74T, 75P, 75T, 76 arranged throughout the thermal management system 28 components and configured to provide feedback to the controller 70 indicative of the operating conditions and/or operating parameters of the engine 10 via communication lines 72, 73. For example, an inlet pressure sensor 74P and an inlet temperature sensor 74T can be arranged in the inlet 12 and configured to measure inlet pressure and inlet temperature. A high pressure stage pressure sensor 75P and a high pressure stage temperature sensor 75T can also be arranged in the high pressure stage 14B and configured to measure high pressure stage pressure and high pressure stage temperature. A temperature sensor 76 may be arranged along the output line 42 so as to measure the temperature of the valve outlet fluid 42F flowing therein.

As shown in FIG. 3, the controller 70 is operably and communicatively connected to the fuel flow control valve 50 and is configured to electronically control the portion of fuel that is directed to the first actuator 54 via the fuel lines 51, 52. As a result, the controller 70 is configured to selectively control the rotation of the first actuator 54. In some embodiments, the fuel flow control valve 50 is an electro-hydraulic servo valve (EHSV) configured to provide precise control over the flow of fuel to each of the fuel lines 51, 52.

In some embodiments, the fuel source 49 may produce both low and high pressure fuel. As such, the controller 70 may be configured to control the fuel flow control valve 50 such that high pressure fuel, also referred to as the "first fuel pressure" herein, is directed to the one of the lines 51, 52 that would cause the actuator 54 to rotate in the desired direction, while directed low pressure fuel to the other of the two lines 51, 52. Specifically, the fuel flow control valve 50 is configured to direct the first portion of fuel having the first fuel pressure (i.e. the higher fuel pressure) toward the one of the spokes 56 on the annular support ring 55 that would cause the desired rotation of the actuator 54.

Illustratively, the actuator 54 provides positional feedback data to the controller 70 regarding the position of the actuator 54. The controller 70 receives the positional feedback data and compares the position of the actuator 54 to a predetermined required position of the actuator 54 such that the low and high pressure bleed air 38F, 40F mixes so as to achieve a required temperature of the valve outlet fluid 42F that prevents ice accretion in the inlet 12 or de-ices the inlet 12, as will be described in greater detail below.

In other words, the controller 70 is configured to selectively direct the first portion of fuel from the fuel source 49 to the first actuator 54 of the mixing unit 32 and thus control rotation of the adjustable inlet gate 45 via the first portion of fuel causing rotation of the first actuator 54. In some embodiments, the controller 70 is configured to electronically control the applied fuel pressures to the lines 51, 52 by sending an electrical signal to the fuel flow control valve 50.

The controller 70 is configured to control the rotation of the adjustable inlet gate 45 based on the operating conditions and/or operating parameters of the engine 10 so as to control the amount of low pressure bleed air 38F and high pressure bleed air 40F exiting the first valve port 36 as valve outlet fluid 42F so as to control the temperature of the valve outlet fluid 42F.

In some embodiments, the controller 70 is configured to selectively control the fuel flow control valve 50 so as to selectively direct the first portion of fuel to the first actuator 54 and control the amount of low pressure bleed air 38F and high pressure bleed air 40F exiting the first valve port 36 as valve outlet fluid 42F such that a first temperature of the valve outlet fluid 42F is equal to or greater than a predetermined temperature such that the valve outlet fluid 42F prevents ice accretion in the inlet 12 or de-ices the inlet 12.

The respective amounts of low pressure bleed air 38F and high pressure bleed air 40F that are utilized in the valve outlet fluid 42F may also be based on a temperature of the low pressure bleed air 38F and a temperature of the high pressure bleed air 40F, as described above. The temperatures of the low pressure bleed air 38F and high pressure bleed air 40F may be measured via additional sensors (not shown) arranged in the compressor stages 14A, 14B or within the low and high pressure bleed lines 38, 40, and/or may be calculated by the controller 70 based on the parameters provided to the controller 70 from the sensors 74P, 74T, 75P, 75T, 76. In particular, in some embodiments, the controller 70 utilizes, at least in part, measured parameters of the high pressure bleed air 40F, such as its pressure as measured by the pressure sensor 75P, as well as measured parameters of the air flowing through the inlet 12, such as its pressure as measured by the pressure sensor 74P, to calculate the temperature of the low pressure bleed air 38F.

For example, if the temperature of the low pressure bleed air 38F is too low to sufficiently prevent ice accretion in the inlet 12 or de-ice the inlet 12, the controller 70 can rotate the adjustable inlet gate 45 such that the valve outlet fluid 42F includes mostly high pressure bleed air 40F. In some embodiments, if the temperature of the low pressure bleed air 38F is too low to sufficiently prevent ice accretion in the inlet 12 or de-ice the inlet 12, the controller 70 can rotate the adjustable inlet gate 45 such that the valve outlet fluid 42F includes only high pressure bleed air 40F. As another example, if the temperature of low pressure bleed air 38F is high enough to sufficiently prevent ice accretion in the inlet 12 or de-ice the inlet 12, the controller 70 can rotate the adjustable inlet gate 45 such that the valve outlet fluid 42F includes mostly low pressure bleed air 40F. In some embodiments, if the temperature of low pressure bleed air 38F is high enough to sufficiently prevent ice accretion in the inlet 12 or de-ice the inlet 12, the controller 70 can rotate the adjustable inlet gate 45 such that the valve outlet fluid 42F includes only low pressure bleed air 40F.

The predetermined temperature that will prevent ice accretion in the inlet 12 or de-ice the inlet 12 can be based on the operating conditions and/or operating parameters of the engine 10. In some embodiments, the predetermined temperature may be selected by the controller 70 from a predetermined schedule of temperatures that are based on known operating conditions and/or operating parameters of the engine 10. In some embodiments, the controller 70 may be configured to dynamically set the predetermined temperature based on measured parameters that are indicative of the operating conditions and/or operating parameters of the engine 10.

A person skilled in the art will understand that the various operating conditions and/or operating parameters described below, although only described in the context of the controller 70 dynamically setting the predetermined temperature, can also be taken into account by the predetermined schedule of predetermined temperatures described above.

In some embodiments, the controller 70 is configured to dynamically set the predetermined temperature based on at least one operating condition of the gas turbine engine that includes a low power state and a high power state. By way of a non-limiting example, in a low power state, the high pressure bleed air 40F may be hot enough to prevent ice accretion in the inlet 12 or de-ice the inlet 12 while the low pressure bleed air 38F is not hot enough yet to do so. This may occur during idle operation of the engine 10, in particular while the aircraft being propelled by the engine 10 is on the ground before or after a flight. As the engine 10 power is increased, the temperature of the low pressure bleed air 38F may become high enough for anti-icing purposes. If the engine 10 power is high enough (i.e. in a high power state), the low pressure bleed air 38F may substantially or entirely comprise the valve outlet fluid 42F to prevent ice accretion in the inlet 12 or de-ice the inlet 12.

A person skilled in the art will understand that, in some operating scenarios of the engine 10, using the low pressure bleed air 38F in the high power state may prevent damage to the inlet 12 structure since the pressure and temperature of the low pressure bleed air 38F increases proportionally with engine 10 power. The entire engine 10 may experience a performance benefit to using lower pressure bleed air 38F when the temperature of the bleed air 38F is sufficient for anti-icing purposes.

In some embodiments, the low power state includes at least one of idle or taxi, and the high power state includes at least one of takeoff, cruise, or landing. In particular, the controller 70 can be configured to further dynamically set the predetermined temperature based on whether the aircraft being propelled by the engine 10 is operating at idle, taxi, takeoff, cruise, or landing.

In some embodiments, the controller 70 can further dynamically set the predetermined temperature based on at least one operating parameter of the engine 10, in particular those measured by the sensors 74P, 74T, 75P, 75T. At least one operating parameter may include at least one of the high pressure stage pressure measured by the high pressure stage pressure sensor 75P, a high pressure stage temperature measured by the high pressure stage temperature sensor 75T, an inlet pressure measured by the inlet pressure sensor 74P, or an inlet temperature measured by the inlet temperature sensor 74T. In some embodiments, the controller 70 is configured to measure a compressor pressure ratio based on the inlet and high pressure stage pressures and base the setting of the predetermined temperature on the pressure ratio.

In some embodiments, the controller 70 is configured to automatically control the fuel flow control valve 50 based on the at least one operating condition and the at least one operating parameter so as to automatically and selectively direct the first portion of fuel from the fuel source 49 to the first actuator 54, and thus regulate the amounts of low pressure bleed air 38F and high pressure bleed air 40F directed to the inlet 12 as the valve outlet fluid 42F. The controller 70 can be further configured to automatically increase the temperature of the valve outlet fluid 42F via control of the fuel flow control valve 50, and thus the adjustable inlet gate 45 of the first valve port 36, in response to the first temperature as measured by the temperature sensor 76 being lower than the predetermined temperature. The controller 70 may increase the temperature of the valve outlet fluid 42F such that the first temperature is equal to or greater than the predetermined temperature.

The controller 70, as described above, may include memory and a processor. The memory and processor are in communication with each other. The processor may be embodied as any type of computational processing tool or equipment capable of performing the functions described herein. For example, the processor may be embodied as a single or multi-core processor(s), digital signal processor, microcontroller, or other processor or processing/controlling circuit.

The memory may be embodied as any type of volatile or non-volatile memory or data storage capable of performing the functions described herein, and may include additional storage. Moreover, the controller 70 may also include additional or alternative components, such as those commonly found in a computer (e.g., various input/output devices, resistors, capacitors, etc.). In other embodiments, one or more of the illustrative controllers 70 of components may be incorporated in, or otherwise form a portion of, another component. For example, the memory, or portions thereof, may be incorporated in the processor.

In operation, the memory may store various data and software used during operation of the controller 70 such as operating systems, applications, programs, libraries, and drivers. The memory is communicatively coupled to the processor via an I/O subsystem, which may be embodied as circuitry and/or components to facilitate input/output operations with the processor, the memory, and other components of the controller 70. In one embodiment, the memory may be directly coupled to the processor, for example via an integrated memory controller hub. Additionally, in some embodiments, the I/O subsystem may form a portion of a system-on-a-chip (SoC) and be incorporated, along with the processor, the memory, and/or other components of the controller 70, on a single integrated circuit chip (not shown).

The controller 70 may be configured to use any one or more communication technologies (e.g., wired, wireless and/or power line communications) and associated protocols (e.g., ETHERNET, INFINIBAND®, BLUETOOTH®, WI-FI®, WiMAX, 3G, 4G LTE, 5G, etc.) to effect such communication among and between system components and devices as described above, including but not limited to between the controller 70, the sensor 70, the DC power bus 14, a user interface, and any other component as would be understood by a person skilled in the art.

A method according to a further aspect of the present disclosure includes a first operation of providing an inlet 12 and an engine core 13 including a compressor 14, the compressor 14 having a low pressure stage 14A and a high pressure stage 14B axially downstream of the low pressure stage 14A, the low pressure stage 14A configured to provide low pressure air and having a low pressure bleed line 38 configured to receive a portion of the low pressure air as low pressure bleed air 38F, and the high pressure stage 14B configured to provide high pressure air having a pressure greater than the low pressure air, and the high pressure stage 14B having a high pressure bleed line 40 configured to receive a portion of the high pressure air as high pressure bleed air 40F.

The method can further include a second operation of providing an environmental control system assembly 30 including a fuel source 49 and a mixing unit 32, the mixing unit 32 including a first valve port 36 fluidically connected to the low pressure bleed line 38 and the high pressure bleed line 40 and configured to receive low pressure bleed air 38F and high pressure bleed air 40F from the low pressure bleed line 38 and the high pressure bleed line 40, and an outlet 42A fluidically connected to the inlet 12 of the engine 10 to prevent ice accretion in the inlet or de-ice the inlet 12. A first portion of fuel from the fuel source 49 is configured to selectively actuate the first valve port 36 so as to selectively regulate amounts of low pressure bleed air 38F from the low pressure bleed line 38 and the high pressure bleed air 40F from the high pressure bleed line 40 flowing to the outlet 42A and exiting the outlet 42A as valve outlet fluid 42F.

The method can further include a third operation of supplying low pressure bleed air 38F and high pressure bleed air 40F to the mixing unit 32 via the low pressure bleed line 38 and the high pressure bleed line 40 so as to form the valve outlet fluid 42F. The method can further include a fourth operation of receiving, at a controller 70 of a control system 68, a first temperature of the valve outlet fluid 42F flowing from the outlet 42A to the inlet 12 of the engine 10. The method can further include a fifth operation of selectively directing, via the controller 70, the first portion of fuel from the fuel source 49 to the mixing unit 32 so as to selectively actuate the first valve port 36 and thus regulate the amounts of low pressure bleed air 38F and high pressure bleed air 40F flowing to and exiting the outlet 42A as the valve outlet fluid 42F such that the first temperature of the valve outlet fluid 42F is equal to or greater than a predetermined temperature such that the valve outlet fluid 42F prevents ice accretion in the inlet 12 or de-ices the inlet 12.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A thermal management system for a gas turbine engine, comprising
    an inlet and an engine core including a compressor, the compressor having a low pressure stage and a high pressure stage axially downstream of the low pressure stage, the low pressure stage configured to provide low pressure air and having a low pressure bleed line configured to receive a portion of the low pressure air as low pressure bleed air, and the high pressure stage configured to provide high pressure air having a pressure greater than the low pressure air, and the high pressure stage having a high pressure bleed line configured to receive a portion of the high pressure air as high pressure bleed air,
    a mixing unit including a first valve port fluidically connected to the low pressure bleed line and the high pressure bleed line and having an adjustable inlet gate on each of the low pressure bleed line and the high pressure bleed line and an outlet fluidically connected to the inlet of the engine to prevent ice accretion in the inlet or de-ice the inlet, wherein the adjustable inlet gate is configured to regulate amounts of the low pressure bleed air from the low pressure bleed line and high pressure bleed air from the high pressure bleed line flowing to the outlet, and
    a fuel source including a fuel flow control valve configured to provide a first portion of fuel at a first fuel pressure to the mixing unit,
    wherein the fuel flow control valve is configured to selectively direct the first portion of the fuel to the mixing unit such that the first portion of the fuel engages with and selectively actuates the adjustable inlet gate so as to regulate the amounts of low pressure bleed air and high pressure bleed air flowing to the outlet and exiting the outlet as valve outlet fluid such that a first temperature of the valve outlet fluid is equal to or greater than a predetermined temperature such that the valve outlet fluid prevents ice accretion in the inlet or de-ices the inlet, and wherein the mixing unit further includes a first actuator fixedly coupled to the adjustable inlet gate, the first actuator being a rotating actuator and the adjustable inlet gate being rotatable and is configured to be rotated via rotation of the first actuator, and wherein the fuel flow control valve is further configured to selectively direct the first portion of fuel to engage with a first side of the first actuator so as to rotate the first actuator in a first rotational direction or to engage with a second side of the first actuator opposite the first side so as to rotate the first actuator in a second rotational direction opposite the first rotational direction so as to rotate the adjustable inlet gate between and including first and second arrangements.

2. The thermal management system of claim 1, further comprising:

a control system including a controller configured to receive the first temperature of the valve outlet fluid flowing from the outlet of the first valve port to the inlet of the engine, wherein the controller is configured to selectively direct the first portion of fuel from the fuel source to the mixing unit so as to selectively actuate the adjustable inlet gate so as to regulate the amounts of low pressure bleed air and high pressure bleed air flowing to the outlet and exiting the outlet as valve outlet fluid based on a second temperature of the low pressure bleed air and a third temperature of the high pressure bleed air, and wherein the second and third temperatures are configured to be measured via additional sensors and/or calculated by the controller.

3. The thermal management system of claim 2, further comprising an output line fluidically connected to and extending between the outlet of the first valve port and the inlet of the engine, and wherein the control system further includes a first temperature sensor communicatively connected to the controller and arranged along the output line so as to measure the temperature of the valve outlet fluid flowing therein and communicate the first temperature to the controller.

4. The thermal management system of claim 3, wherein the controller is further configured to dynamically set the predetermined temperature of the valve outlet fluid that prevents ice accretion in the inlet of engine based on at least one operating condition of the gas turbine engine that includes a low power state and a high power state.

5. The thermal management system of claim 4, wherein the low power state includes at least one of idle or taxiing, and wherein the high power state includes at least one of takeoff, cruise, or landing.

6. The thermal management system of claim 4, wherein the control system further includes a first pressure sensor and a second temperature sensor arranged in the high pressure stage of the compressor and a second pressure sensor and a third temperature sensor arranged in the inlet, and wherein the controller is further configured to further dynamically set the predetermined temperature of the valve outlet fluid that prevents ice accretion in the inlet of engine further based on at least one operating parameter including at least one of a high pressure stage pressure measured by the first pressure sensor, a high pressure stage temperature measured by the second temperature sensor, an inlet pressure measured by the second pressure sensor, a speed of the compressor, a flow rate of fuel to a combustor included in the engine core, or an inlet temperature measured by the third temperature sensor.

7. The thermal management system of claim 6, wherein the controller is configured to automatically and selectively control the fuel flow control valve based on the at least one operating condition and the at least one operating parameter so as to automatically and selectively direct the first portion of fuel from the fuel source to the mixing unit and regulate the amounts of low and high pressure bleed air from the low and high pressure bleed lines so as to regulate the temperature of the valve outlet fluid, and wherein the controller is further configured to automatically increase the temperature of the valve outlet fluid via control of the fuel flow control valve in response to the first temperature being lower than the predetermined temperature such that the first temperature is equal to or greater than the predetermined temperature.

8. The thermal management system of claim 7, wherein the controller is configured to electronically control the fuel flow control valve to selectively direct the first portion of fuel from the fuel source to the mixing unit, and wherein the controller is configured to electronically control the fuel flow control valve by sending a signal to the fuel flow control valve.

9. The thermal management system of claim 1, wherein the first valve port includes a mixing chamber within the adjustable inlet gate, a first inlet fluidically connected to the low pressure bleed line and discharging into the mixing chamber, and a second inlet fluidically connected to the high pressure bleed line and discharging into the mixing chamber, wherein the low and high pressure bleed air from the low and high pressure bleed lines is configured to enter the mixing chamber and subsequently exit the first valve port via the outlet, wherein the adjustable inlet gate is configured to selectively open and close the first and second inlets so as to regulate the amounts of low and high pressure bleed air from the low and high pressure bleed lines flowing into the mixing chamber and subsequently to the outlet, and wherein the valve outlet fluid includes a mixture of the low pressure bleed air and the high pressure bleed air.

10. The thermal management system of claim 9, wherein the adjustable inlet gate includes a first opening and a second opening spaced apart from the first opening and is configured to move between (i) the first arrangement in which the adjustable inlet gate substantially covers the first inlet and the second opening aligns with the second inlet, and (ii) the second arrangement in which the adjustable inlet gate substantially covers the second inlet and the first opening aligns with the first inlet.

11. The thermal management system of claim 10, wherein the mixing unit further includes a first fuel line and a second fuel line spaced apart from the first fuel line, wherein the first portion of fuel is divided between a first sub-portion of fuel directed to the first fuel line and a second sub-portion of fuel directed to the second fuel line, and wherein the fuel flow control valve is further configured to selectively direct the first sub-portion of fuel through the first fuel line and subsequently to the first side of the first actuator so as to rotate the first actuator in the first rotational direction and to selectively direct the second sub-portion of fuel through the second fuel line and subsequently to the second side of the first actuator so as to rotate the first actuator in the second rotational direction.

12. A thermal management system for a gas turbine engine, comprising an inlet and an engine core including a compressor, the compressor having a low pressure stage and a high pressure stage axially downstream of the low pressure stage, the low pressure stage configured to provide low pressure air and having a low pressure bleed line configured to receive a portion of the low pressure air as low pressure bleed air, and the high pressure stage configured to provide high pressure air having a pressure greater than the low pressure air, and the high pressure stage having a high pressure bleed line configured to receive a portion of the high pressure air as high pressure bleed air, an environmental control system assembly including a fuel source and a mixing unit, the mixing unit including a first valve port fluidically connected to the low pressure bleed line and the high pressure bleed line and configured to receive low pressure bleed air and high pressure bleed air from the low pressure bleed line and the high pressure bleed line, and an outlet fluidically connected to the inlet of the engine to prevent ice accretion in the inlet or de-ice the inlet, wherein a first portion of fuel at a first fuel pressure from the fuel source is configured to selectively actuate the first valve port so as to selectively regulate amounts of low pressure bleed air from the low pressure bleed line and the high pressure bleed air from the high pressure bleed line flowing to the outlet and exiting the outlet as valve outlet fluid, and a control system including a controller configured to receive a first temperature of the valve outlet fluid flowing from the outlet of the first valve port to the inlet of the engine, wherein the controller is configured to selectively direct the first portion of fuel from the fuel source to the mixing unit so as to selectively actuate the first valve port and thus regulate the amounts of low and high pressure bleed air flowing to and exiting the outlet as the valve outlet fluid such that the first temperature of the valve outlet fluid is equal to or greater than a predetermined temperature such that the valve outlet fluid prevents ice accretion in the inlet of engine, wherein the controller is further configured to dynamically set the predetermined temperature of the valve outlet fluid that prevents ice accretion in the inlet of engine based on at least one operating condition of the gas turbine engine that includes a low power state and a high power state, and wherein the control system further includes a first pressure sensor and a first temperature sensor arranged in a high pressure stage of the compressor to which the high pressure bleed line is fluidically connected, and a second pressure sensor and a second temperature sensor arranged in the inlet, and wherein the controller is further configured to further dynamically set the predetermined temperature of the valve outlet fluid that prevents ice accretion in the inlet of engine further based on at least one operating parameter including at least one of a high pressure stage pressure measured by the first pressure sensor, a high pressure stage temperature measured by the first temperature sensor, an inlet pressure measured by the second pressure sensor, or an inlet temperature measured by the second temperature sensor.

13. The thermal management system of claim 12, further comprising an output line fluidically connected to and extending between the outlet of the first valve port and the inlet of the engine, wherein the control system further includes a third temperature sensor communicatively connected to the controller and arranged along the output line so as to measure the temperature of the valve outlet fluid flowing therein and communicate the first temperature to the controller, wherein the controller is configured to selectively direct the first portion of fuel from the fuel source to the mixing unit so as to selectively actuate the first valve port and thus regulate the amounts of low and high pressure bleed air flowing to and exiting the outlet as the valve outlet fluid based on a second temperature of the low pressure bleed air and a third temperature of the high pressure bleed air, and wherein the second and third temperatures are configured to be measured via additional sensors and/or calculated by the controller.

14. The thermal management system of claim 12, wherein the low power state includes at least one of idle or taxiing, and wherein the high power state includes at least one of takeoff, cruise, or landing.

15. The thermal management system of claim 12, wherein the controller is configured to automatically and selectively control the fuel flow control valve based on the at least one operating condition and the at least one operating parameter so as to automatically and selectively direct the first portion of fuel from the fuel source to the mixing unit and regulate the amounts of low and high pressure bleed air from the low and high pressure bleed lines so as to regulate the temperature of the valve outlet fluid, and wherein the controller is further configured to automatically increase the temperature of the valve outlet fluid via control of the fuel flow control valve in response to the first temperature being lower than the predetermined temperature such that the first temperature is equal to or greater than the predetermined temperature.

16. The thermal management system of claim 15, wherein the controller is configured to electronically control the fuel flow control valve to selectively direct the first portion of fuel from the fuel source to the mixing unit, and wherein the controller is configured to electronically control the fuel flow control valve by sending a signal to the fuel flow control valve.

17. The thermal management system of claim 12, wherein the first valve port includes a mixing chamber within an adjustable inlet gate, a first inlet fluidically connected to the low pressure bleed line and discharging into the mixing chamber, a second inlet fluidically connected to the high pressure bleed line and discharging into the mixing chamber, wherein the adjustable inlet gate is actuatable by the first portion of fuel from the fuel source and configured to selectively open and close the first and second inlets, wherein the outlet is fluidically connected to the inlet of the engine, and wherein the valve outlet fluid includes a mixture of the low pressure bleed air and the high pressure bleed air.

18. A method comprising
providing an inlet and an engine core including a compressor, the compressor having a low pressure stage and a high pressure stage axially downstream of the low pressure stage, the low pressure stage configured to provide low pressure air and having a low pressure bleed line configured to receive a portion of the low pressure air as low pressure bleed air, and the high pressure stage configured to provide high pressure air having a pressure greater than the low pressure air, and the high pressure stage having a high pressure bleed line configured to receive a portion of the high pressure air as high pressure bleed air, providing an environmental control system assembly including a fuel source and a mixing unit, the mixing unit including a first valve port fluidically connected to the low pressure bleed line and the high pressure bleed line and configured to receive low pressure bleed air and high pressure bleed air from the low pressure bleed line and the high pressure bleed line, and an outlet fluidically connected to the inlet of the engine to prevent ice accretion in the inlet or de-ice the inlet, wherein a first portion of fuel at a first fuel pressure from the fuel source is configured to selectively actuate the first valve port so as to selectively regulate amounts of low pressure bleed air from the low pressure bleed line and the high pressure bleed air from the high pressure bleed line flowing to the outlet and exiting the outlet as valve outlet fluid, supplying low pressure bleed air and high pressure bleed air to the mixing unit via the low pressure bleed line and the high pressure bleed line so as to form the valve outlet fluid, receiving, at a controller of a control system, a first temperature of the valve outlet fluid flowing from the outlet to the inlet of the engine, and selectively directing, via the controller, the first portion of fuel from the fuel source to the mixing unit so as to selectively actuate the first valve port and thus regulate the amounts of low pressure bleed air and high pressure bleed air flowing to and exiting the outlet as the valve outlet fluid such that the first temperature of the valve outlet fluid is equal to or greater than a predetermined temperature such that the valve outlet fluid prevents ice accretion in the inlet or de-ices the inlet, wherein the controller is configured to dynamically set the predetermined temperature of the valve outlet fluid that prevents ice accretion in the inlet of engine based on at least one operating condition of the gas turbine engine that includes a low power state and a high power state, and wherein the control system further includes a first pressure sensor and a first temperature sensor arranged in a high pressure stage of the compressor to which the high pressure bleed line is fluidically connected, and a second pressure sensor and a second temperature sensor arranged in the inlet, and wherein the controller is further configured to further dynamically set the predetermined temperature of the valve outlet fluid that prevents ice accretion in the inlet of engine further based on at least one operating parameter including at least one of a high pressure stage pressure measured by the first pressure sensor, a high pressure stage temperature measured by the first temperature sensor, an inlet pressure measured by the second pressure sensor, or an inlet temperature measured by the second temperature sensor.

* * * * *